United States Patent [19]

Oyama

[11] Patent Number: 4,641,374
[45] Date of Patent: Feb. 3, 1987

[54] INFORMATION MEDIUM

[75] Inventor: Masumi Oyama, Tokyo, Japan

[73] Assignee: Kabushiki Kaisha Toshiba, Kawasaki, Japan

[21] Appl. No.: 639,422

[22] Filed: Aug. 10, 1984

[51] Int. Cl.$^4$ .............................................. H04B 9/00
[52] U.S. Cl. .................................. 455/603; 455/606; 342/5
[58] Field of Search ............... 455/606, 607, 617, 603; 340/505, 572; 367/2; 343/6.5 R, 6.5 SS, 6.5 LC, 6.8 LC, 6.8 R

[56] References Cited

U.S. PATENT DOCUMENTS 4,213,119  7/1980  Ward et al. .................... 455/606
4,449,206  5/1984  Tokitsu et al. ................. 455/606

FOREIGN PATENT DOCUMENTS 0040544  11/1981  European Pat. Off. .
75317  3/1983  European Pat. Off. ............ 455/603
0098659  1/1984  European Pat. Off. .
2325251  4/1977  France .
0061373  9/1982  France .
1197292  7/1970  United Kingdom .
1534832  12/1978  United Kingdom .
2082816  3/1982  United Kingdom .

Primary Examiner—Joseph A. Orsino, Jr.
Attorney, Agent, or Firm—Cushman, Darby and Cushman

[57] ABSTRACT

An information medium used for receiving/delivering information from/to an exterior device, which includes a receiver circuit for receiving a modulated input signal from the exterior device, a demodulator for demodulating the modulated input signal to provide specific information, a decoder for decoding the specific information to provide a decoded instruction, a memory for storing given data, a controller for controlling a write or read operation of the memory in accordance with the contents of the decoded instruction, a modulator for generating a modulated signal which corresponds to data read-out from the memory, a transmitter circuit for delivering to the exterior device a transmission signal corresponding to the modulated signal, a battery for generating electric power, and a switch circuit for selectively supplying the electric power to any of the receiver circuit, demodulator, modulator and transmitter circuit. The selection of the switch circuit for the power supply depends on the contents of the specific information.

13 Claims, 15 Drawing Figures

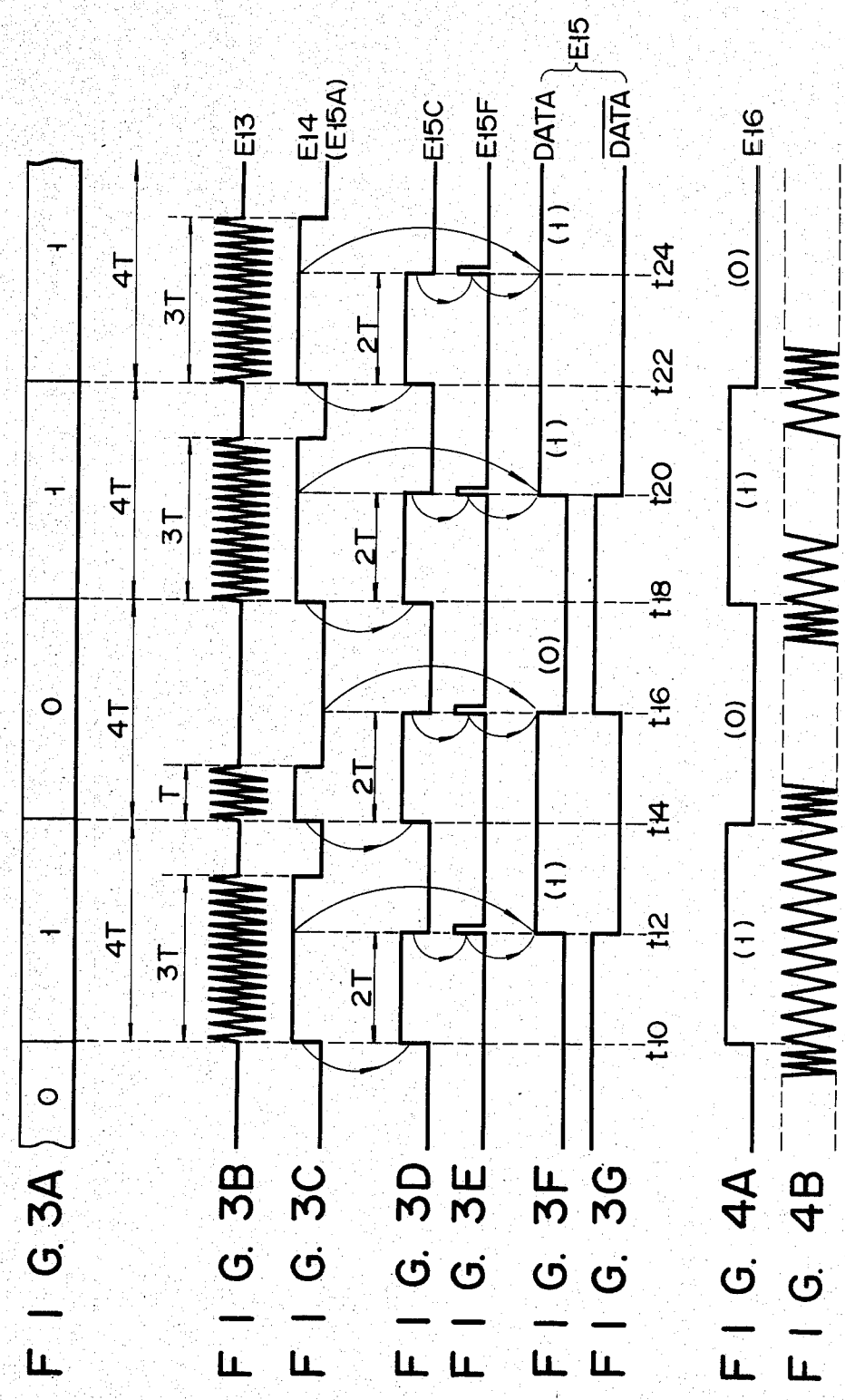

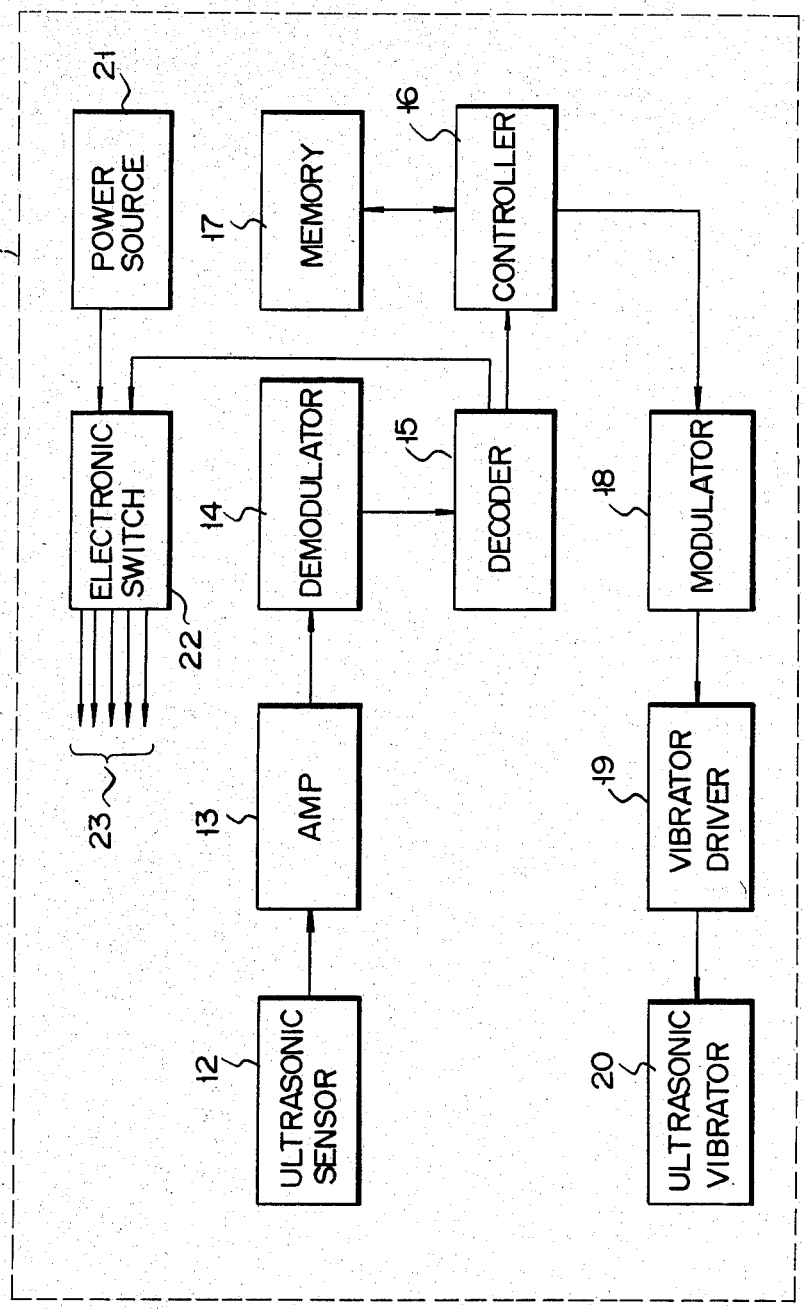
F I G. 5

INFORMATION MEDIUM

BACKGROUND OF THE INVENTION

The present invention relates to an information medium which may have a function similar to a tag and is chiefly used for discriminating one from others.

An information medium of this kind generally has a card-like figure. Such a medium is utilized to an electronic tag, electronic key, electronic entrance passport or the like. The medium is provided with a memory device for storing specific information which is used to achieve the discrimination between one and others. The medium can resend the specific information in accordance with the contents of instructions given from an exterior device. The exterior device is generally a computer-implemented device which decodes the resent specific information to discriminate the particular one of individual information mediums.

In a conventional information medium, the reception/delivery of signals from/to an external device, of the power supply for respective circuit elements contained in the information medium, is carried out via electrical contacts provided on the surface of the medium. When electrical contacts are used, the insertion direction of the medium against the external device must be exactly specified, and poor electrical contact due to contaminations of the contacts is likely to occur. From the above, handling of a conventional medium is not so easy and the expected life span of the medium is relatively short.

SUMMARY OF THE INVENTION

It is accordingly the object of the present invention to provide an information medium which is free from the above-mentioned drawbacks.

To achieve the above object, an information medium of the invention utilizes a radio wave, sonic wave or light for receiving/delivering signals from/to an external device, so that no electrical contact is required. Further, an information medium of the invention may have a function to change the stored contents of the memory device, so that various possible uses are expected. Still further, an information medium of the invention contains a battery (or any proper electric power source) and a switch which serves to energize only the necessary part of circuit elements in the medium by electric power from the battery, so that the power consumption for the battery is saved.

BRIEF DESCRIPTION OF THE DRAWINGS

FIGS. 3A to 3G are timing charts explaining information receiving operation of the information medium shown in FIGS. 2A to 2C;

FIGS. 4A and 4B are timing charts explaining information delivering operation of the information medium shown in FIGS. 2A to 2C;

FIG. 5 shows a block configuration of an information medium according to another embodiment of the present invention, wherein a sonic wave is utilized for the signal reception/delivery.

DETAILED DESCRIPTION OF THE PREFERRED EMBODIMENTS

Figure 1:
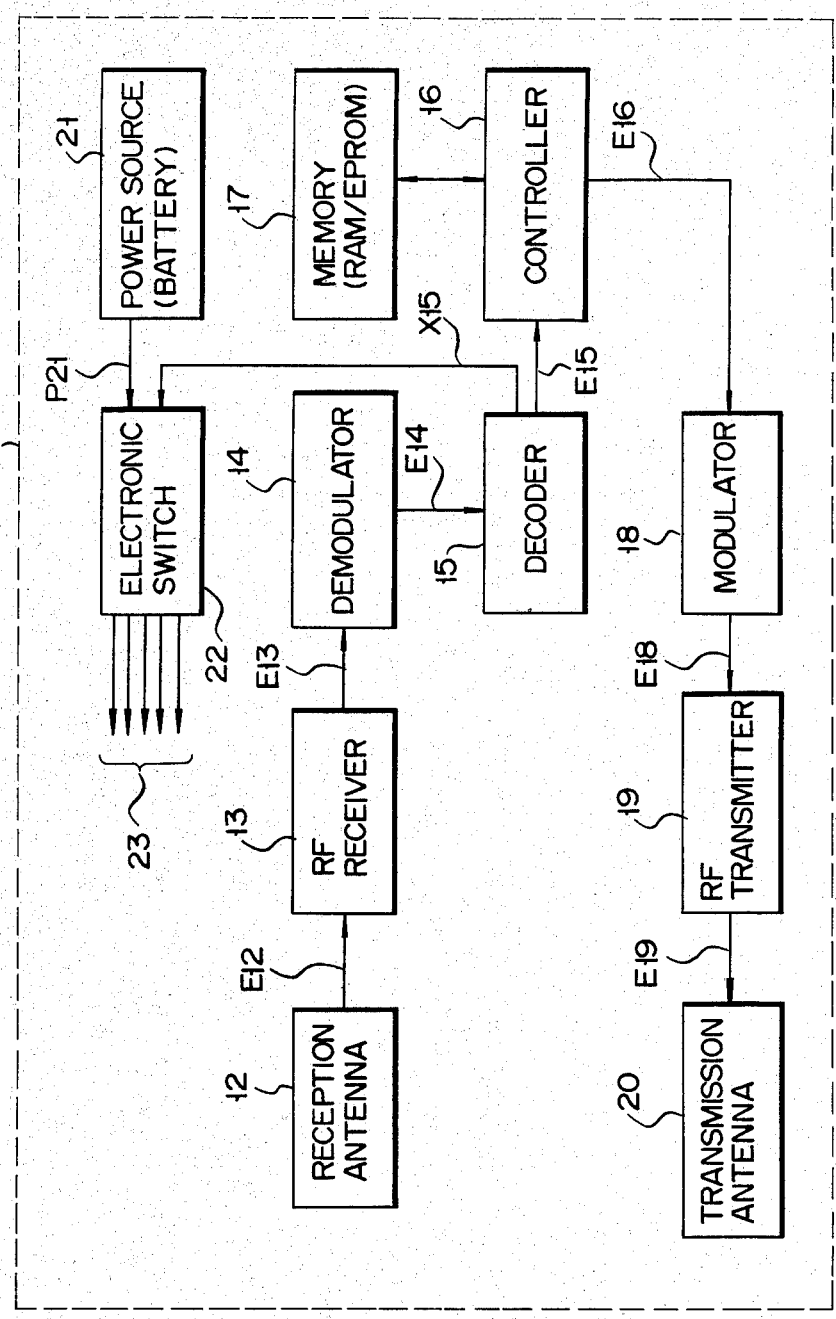
FIG. 1 shows a block configuration of an information medium according to one embodiment of the present invention, wherein a radio wave is utilized for the signal reception/delivery.

Now description will be given to preferred embodiments of the present invention with reference to the accompanying drawings. In the drawings, common elements are denoted by the same reference numerals to avoide redundant explanation.

FIG. 1 shows a block configuration of an information medium 11 which utilizes a radio wave for the signal reception and signal delivery. Generally, information medium 11 has a card-like figure. When a computer-implemented external device (not shown) accesses medium 11, a radio wave signal transmitted from the external device is caught by a reception antenna 12. Antenna 12 is, e.g., a loop antenna having coaxial windings and is installed in medium 11. The radio wave signal has an intermediate frequency (e.g., 410 kHz) and is frequency-modulated (FM), phase-modulated (PM) or amplitude-modulated (AM) by binary information of instruction data etc. ISO code, ASCII code or the like may be used for the binary information.

The radio wave signal may include 16 bits command portion for writing or reading and 512 bits data portion. The radio wave signal may also include sync signal etc. Typical contents of the radio wave signal are as follows:
(a) WRITE MODE: 1111111101111111 (write command) and 110101 - - - 00101 (512 bits data)
(b) READ MODE: 1111111100000000 (read command) and non data
(c) ERASE MODE: 1111111101111111 (write command) and 000000—00000 (512 bits all 0)

An exemplified wave form of 0/1 data are illustrated in FIG. 3B. In FIG. 3B, a period 4T is assigned for each bit. The data "1" has an RF carrier portion of 3T, and the data "0" has an RF carrier portion of T. The transmission rate for eriod T is set at 9600 bps (bit per second), for example. Therefore, the transmission rate of the data (=4T) becomes 2400 bps. (Further details thereof will be described later.)

A reception signal E12 caught by antenna 12 is supplied to an RF receiver 13 which comprises band-pass filters, amplifiers and so on. Receiver 13 eliminates noises involved in signal E12 by the filters and amplifies the noise-eliminated signal to a prescribed amplitude to provide an amplified received signal E13. When the contents of signal E13 are as shown in FIG. 3A, signal E13 may have a wave form as shown in FIG. 3B. Signal E13 is demodulated by a demodulator 14 and specific binary information E14 is extracted from the demodulated signal. Information E14 is supplied to a decoder 15. Decoder 15 decodes the instructions or contents (command, data) of information E14 sequentially supplied from demodulator 14. Decoded instructions E15 of information E14 include a write command, read command, erase command, etc., respectively used for a memory 17. Memory 17 may be a RAM or EPROM. Instructions E15 also include data to be stored in memory 17. Instructions E15 are supplied to a controller 16 which is coupled to memory 17. Controller 16 serves to write, read or erase the data in memory 17 according to the write command, read command or erase command.

Binary information E16 (FIG. 4A) being particular to the medium 11 and so on are read out by controller 16 from memory 17. Information E16 etc., obtained by controller 16 are supplied to a modulator 18. In modulator 18, information E16 is modulated by a two-frequency shift keying (FSK) method with given intermediate frequencies (e.g., 430 kHz and 480 kHz), and is converted to a modulated signal E18 (FIG. 4B). Typical contents of signal E18 are as follows:

READ MODE: 110101—00101 (512 bits data) Signal E18 may further include a start/stop bit for a start-stop sync system, an error detection bit, etc. The transmission rate of signal E18 is 9800 bps, for example. Signal E18 is supplied to an RF transmitter 19. Transmitter 19 supplies a transmission antenna 20 with an RF signal E19 corresponding to signal E18. Antenna 20 may be a loop antenna. RF signal E19 is radiated from antenna 20 to the exterior of medium 11.

When an external device (not shown) catches the radio wave of RF signal E19 being transmitted from antenna 20, the external device discriminates the particular information E16 of medium 11. If the external device judges according to the contents of information E16 that the medium 11 is proper one, the external device then checks the contents of data stored in memory 17.

Decoder 15 controls by a control output X15 the selection state of an electronic switch 22. Switch 22 receives electric power P21 from a battery 21 and selectively applies power P21 to output terminals 23 in accordance with the contents of output X15. Although not illustrated in FIG. 1, terminals 23 are connected to prescribed circuit elements in medium 11. Battery 21 may have a thin plate-like figure and is installed in medium 11. A lithium battery, Ni-Cd battery, solar cell, etc., may be used for battery 21. When control output X15 designates that medium 11 is to be in a reception mode, the selection state of switch 22 becomes such that power P21 from battery 21 serves to energize receiver 13 and demodulator 14. When control output X15 designates that medium 11 is to be in a transmission (or delivery) mode, the selection state of switch 22 becomes such that power P21 from battery 21 serves to energize transmitter 19 and modulator 18. Similarly, the selection state of switch 22 may be controlled by control output X15 in a manner that only particular circuit elements in medium 11, which are necessary to perform a prescribed operation designated by the contents of information E14, are energized or activated by battery 21.

According to the above configuration, since only the necessary circuit elements are energized by battery 21 based on the result of decoding in decoder 15, or unused circuit elements are not powered, the power consumption for battery 21 can be minimized. Further, since the stored contents in memory 17 can be changed by erasing old data and by writing new data, the variety and utility of information medium 11 of the invention are expanded.

Incidentally, a single antenna may be commonly used for reception antenna 12 and transmission antenna 20, and the circuit elements 13 to 19 and 22 may be circuit-integrated, preferably by a CMOS process. On the other hand, the binary information may be coded by a specific code other than well known ISO or ASCII code. Thus, ISO- or ASCII-coded information may be further coded or modified by a proper secret manner before storing in memory 17, so that a leakage of the secret information is prevented.

Figure 2A:
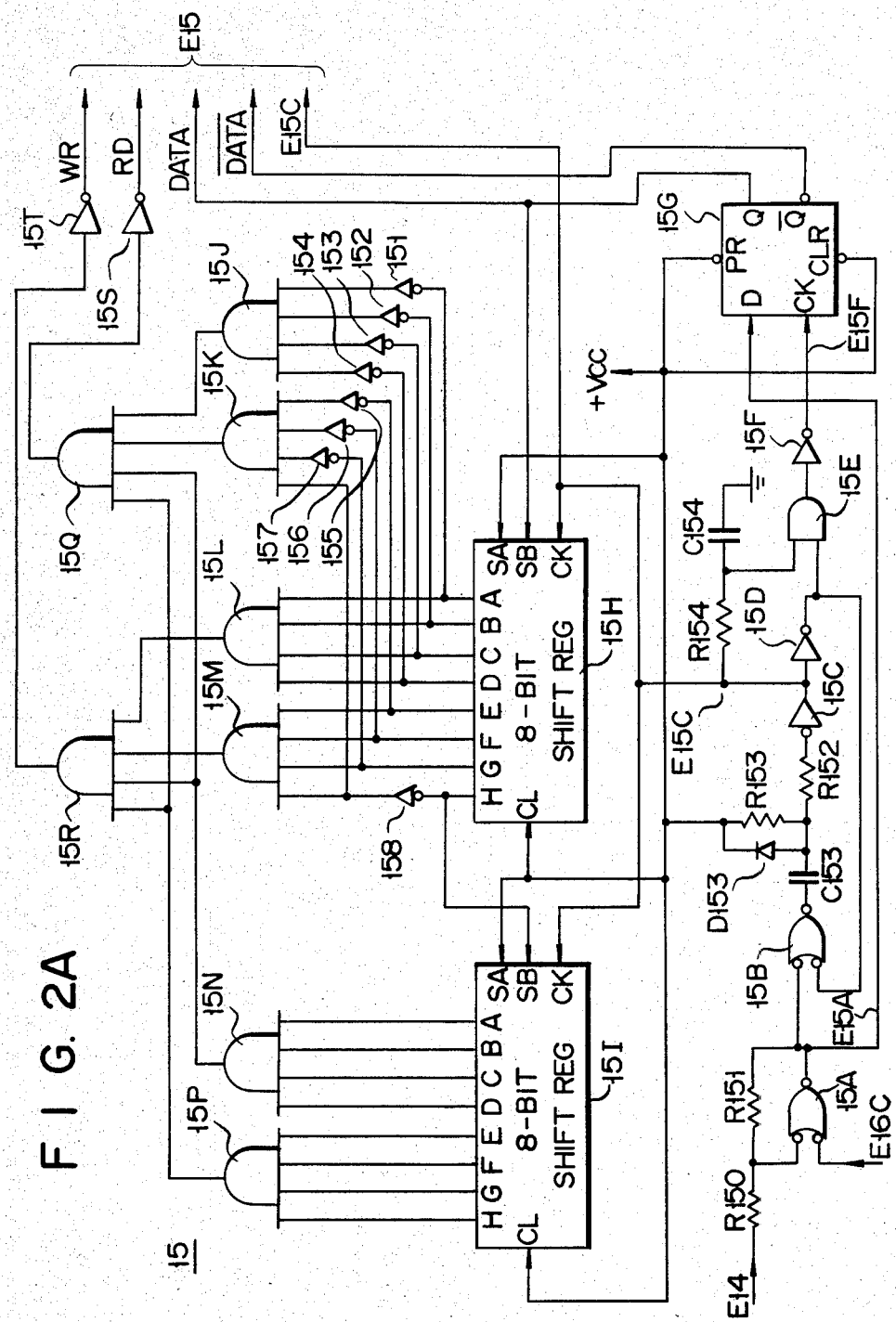
FIG. 2A shows details of a circuit element 15 in FIG. 1.
Figure 2B:
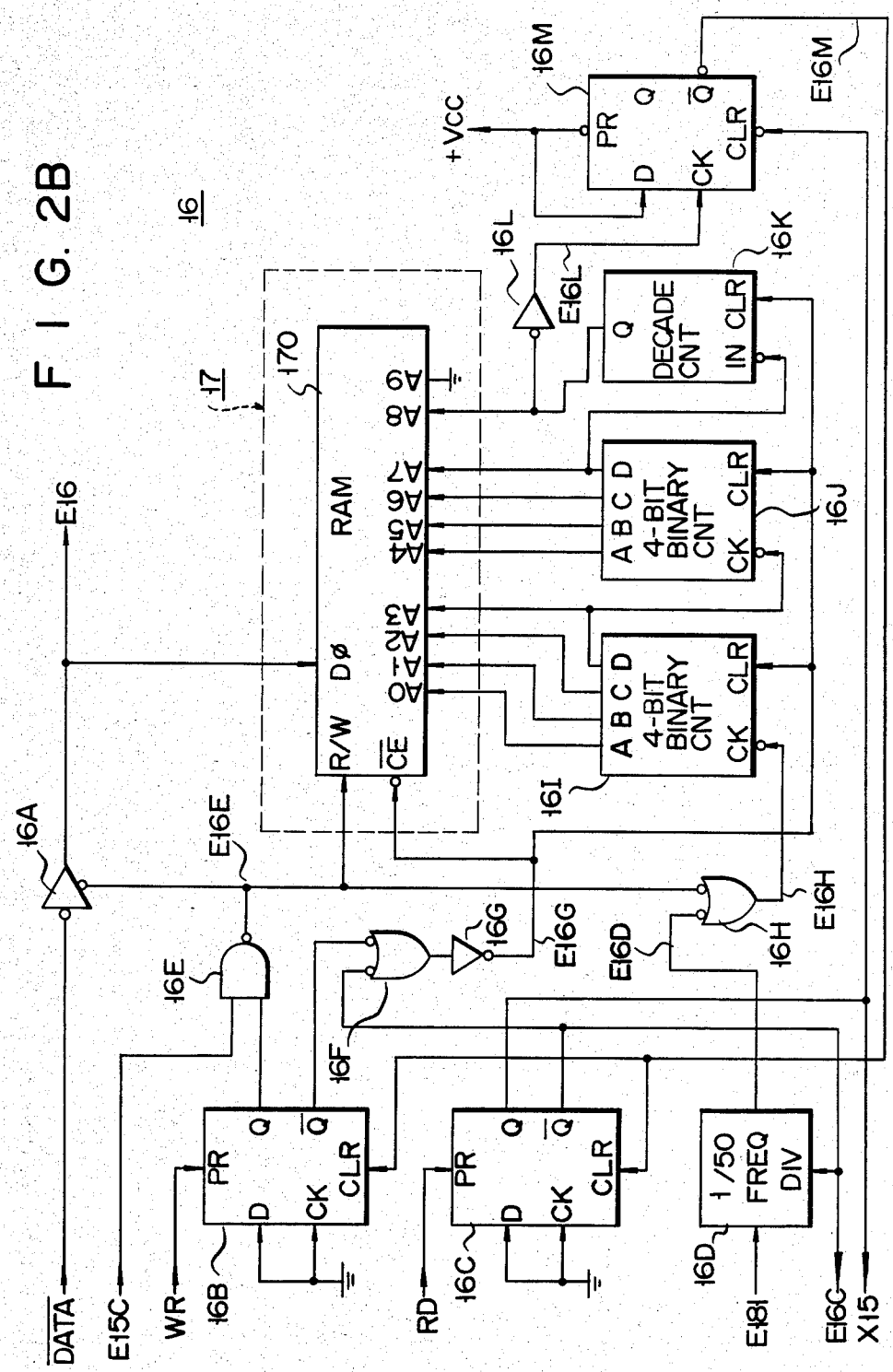
FIG. 2B shows details of circuit elements 16 and 17 in FIG. 1.
Figure 2C:
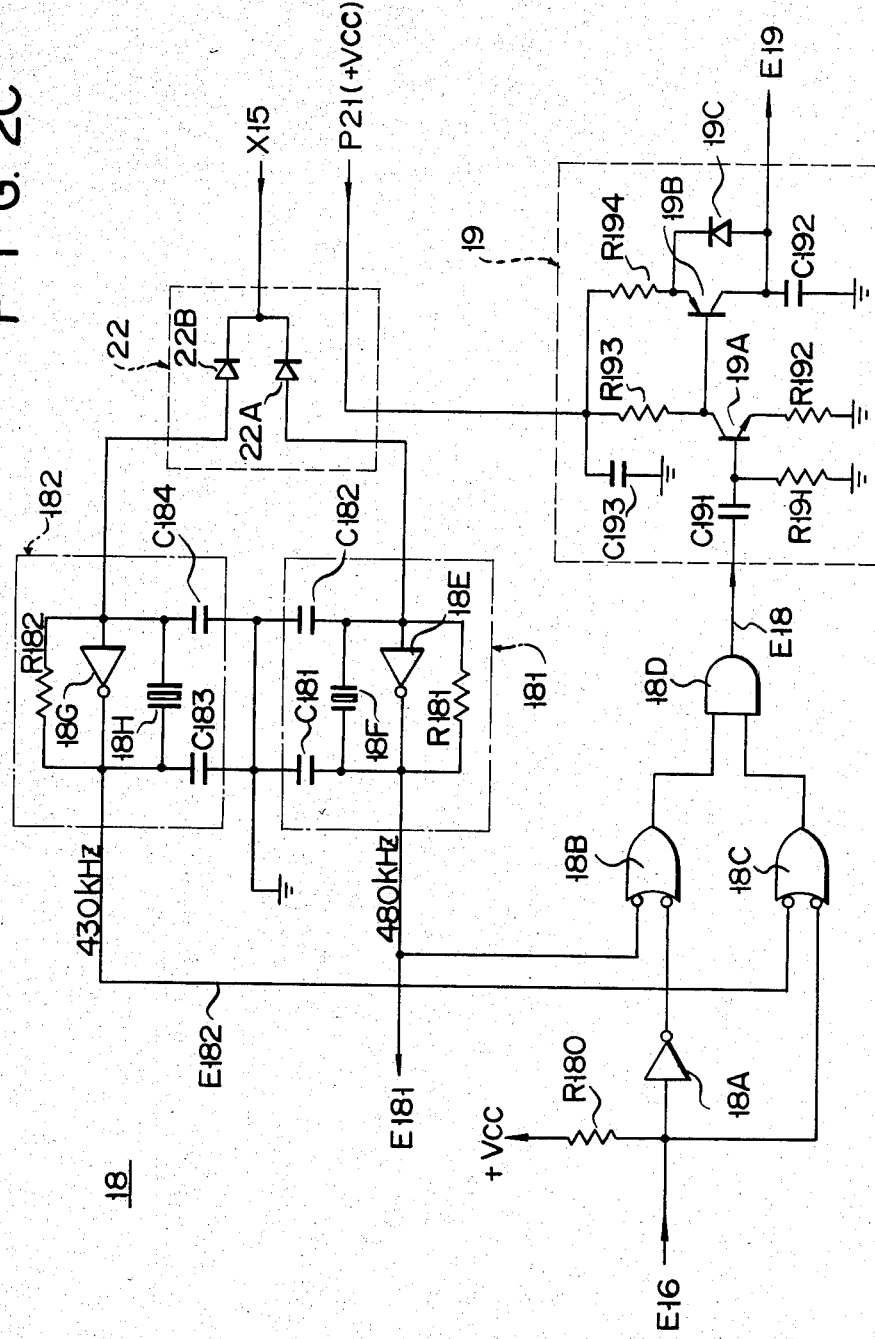
FIG. 2C shows details of circuit elements 18, 19 and 22 in FIG. 1.

FIGS. 2A to 2C show an example of circuit elements 15 to 19 and 22 in FIG. 1. FIGS. 3A to 3G are timing charts explaining information receiving operation of the information medium shown in FIGS. 2A to 2C. FIGS. 4A and 4B are timing charts explaining information delivering operation of the information medium shown in FIGS. 2A to 2C.

FIG. 2A shows details of decoder 15. Information E14 is supplied via a resistor R150 to one inverted input of a NOR gate 15A. This inverted input is coupled via a resistor R151 to the output of gate 15A. The other inverted input of gate 15A receives an inhibition signal E16C which will be described later. Such a two inverted inputs NOR gate is functionally equivalent to a two-input AND gate. An output signal E15A (FIG. 3C) from gate 15A is supplied to one inverted input of a NOR gate 15B. An output signal from gate 15B is supplied via a capacitor C153 and a resistor R152 to an inverter 15C. The input of inverter 15C is pulled-up by a power supply potential +Vcc via a series circuit of resistors R152 and R153. A diode D153 which is reversely biased by +Vcc is parallel connected to resistor R153. An output signal E15C (FIG. 3D) from inverter 15C is supplied via an inverter 15D to one input of an AND gate 15E. The output of inverter 15D is fed back to the other inverted input of gate 15B. Signal E15C is supplied via a resistor R154 to the other input of gate 15E. This other input is circuit-grounded via a capacitor C154. An output signal from gate 15E is inverted through an inverter 15F and the inverted output signal is supplied as a clock pulse E15F (FIG. 3E) to the clock input CK of a D type flip-flop 15G. The D input of flip-flop 15G receives the signal E15A from gate 15A. The preset (PR) and clear (CLR) inputs of flip-flop 15G receives +Vcc potential. The Q output of flip-flop 15G provides a signal DATA (FIG. 3F), and the inverted $\overline{Q}$ output thereof provides an inverted signal $\overline{DATA}$ (FIG. 3G).

Signal DATA is supplied to a data input SB of an 8-bit shift register 15H. Shift register 15H is clocked by signal E15C obtained from inverter 15C. The 8th bit output H of shift register 15H is supplied to a data input SB of an 8-bit shift register 15I which is also clocked by signal E15C. The 1st bit output A of shift register 15H is supplied via an inverter 151 to the 1st input of an AND gate 15J. The 2nd bit output B of register 15H is supplied via an inverter 152 to the 2nd input of gate 15J. The 3rd bit output C of register 15H is supplied via an inverter 153 to the 3rd input of gate 15J. The 4th bit output D of register 15H is supplied via an inverter 154 to the 4th input of gate 15J. Similarly, the 5th to 8th bit outputs E to H of register 15H are respectively supplied via inverters 155 to 158 to the 1st to 4th inputs of an AND gate 15K. Outputs A to D of shift register 15H is supplied to a four-input AND gate 15L. Outputs E to G of shift register 15H is supplied to the first three inputs of a four-input AND gate 15M. The 4th input of gate 15M receives an output from inverter 158. Outputs A to D of shift register 15I is supplied to a four-input AND gate 15N. Outputs E to H of shift register 15I is supplied to a four-input AND gate 15P.

An output signal from gate 15J is supplied to the 1st input of a four-input AND gate 15Q. An output signal from gate 15k is supplied to the 2nd input of gate 15Q. An output signal from gate 15N is supplied to the 3rd input of gate 15Q. An output signal from gate 15P is supplied to the 4th input of gate 15Q. In similar manner, outputs from gates 15L, 15M, 15N and 15P are supplied to the 1st to 4th inputs of a four-input AND gate 15R, respectively. An output signal from gate 15R is inverted via an inverter 15T and supplied as a write pulse WR. An output signal from gate 15Q is inverted via an inverter 15S and supplied as a read pulse RD. WR, RD, $\overline{DATA}$, DATA and E15C are used as the instructions E15.

FIG. 2B shows details of controller 16 and memory 17. Signal $\overline{DATA}$ from D flip-flop 15G (FIG. 2A) is inputted to an inverting bus buffer (three state buffer) 16A. Buffer 16A provides the information E16 (FIG. 3F). The output circuit of buffer 16A is connected to a data port D$\phi$ of RAM 170 which constitutes the memory 17 in FIG. 1. The state control input of buffer 16A receives a read/write signal E16E. Signal E16E is obtained from a NAND gate 16E and is supplied also to a read/write designation input R/W of RAM 170. One input of gate 16E receives output signal E15C from inverter 15C (FIG. 2A). The other input of gate 16E receives a Q output signal from a D flip-flop 16B. A present input PR of flip-flop 16B receives pulse WR from inverter 15T (FIG. 2A). D input and clock input CK of flip-flop 16B are circuit-grounded. An inverted $\overline{Q}$ output signal from flip-flop 16B is supplied to one inverted input of OR gate 16F. The other inverted input of gate 16F receives an inverted $\overline{Q}$ output signal from a D flip-flop 16C. Gate 16F is functionally equivalent to a NAND gate. An output signal from gate 16F is inverted via an inverter 16G and the inverted output signal E16G from inverter 16G is supplied as a chip enable signal to an inverted chip enable input $\overline{CE}$ of RAM 170. The preset input PR of flip-flop 16C receives pulse RD from inverter 15S (FIG. 2A). D input and clock input CK of flip-flop 16C are circuit-grounded.

Signal E16E is supplied to one inverted input of an OR gate 16H which functions as a NAND gate. The other inverted input of gate 16H receive a frequency-divided signal E16D (9.6 kHz) from a 1/50 frequency divider 16D. Divider 16D receives a 480 kHz signal E181 (which will be mentioned later with reference to FIG. 2C). An output signal E16H from gate 16H is supplied to a clock input CK of a 4-bit binary counter 16I. The clearing for counter 16I is carried out by chip enable signal E16G. Four-bit outputs A to D of counter 16I are respectively connected to address inputs A0 to A3 of RAM 170. The 4th output D of counter 16I is connected to a clock input CK of a 4-bit binary counter 16J. The clearing for counter 16J is carried out by signal E16G. Four-bit outputs A to D of counter 16J are respectively connected to address inputs A4 to A7 of RAM 170. The 4th output D of counter 16J is connected to an input of a decade counter 16K. Counter 16K is also cleared by signal E16G. An output Q of counter 16K is connected to an address input A8 of RAM 170. The Q output signal from counter 16K is inverted via an inverter 16L and the inverted output signal E16L from inverter 16L is supplied to a clock input CK of a D flip-flop 16M. D input and preset (PR) input of flip-flop 16M receive +Vcc potential. Flip-flop 16M is cleared by control output X15 which is obtained from the Q output of flip-flop 16C. An inverted $\overline{Q}$ output signal from flip-flop 16M clears each of flip-flops 16B and 16C. The inverted $\overline{Q}$ output signal from flip-flop 16C clears frequency divider 16D and is used as said inhibition signal E16C which is supplied to gate 15A (FIG. 2A).

FIG. 2C shows details of modulator 18, transmitter 19 and electronic switch 22. Information E16 from RAM 170 (FIG. 2B) is supplied to an inverter 18A. The input of inverter 18A is pulled-up by +Vcc via a resistor R180. An output of inverter 18A is connected to one inverted input of an OR gate 18B. The other inverted input of gate 18B receives a 480 kHz signal E181. Information E16 is supplied to one inverted input of an OR gate 18C. The other inverted input of gates 18C receives a 430 kHz signal E182. Each of gate 18B and 18C is functionally equivalent to a NAND gate. Output signals from gates 18B and 18C are supplied to an AND gate 18D. Gate 18D provides the modulated signal E18 (FIG. 4B).

480 kHz signal E181 is obtained from a X'tal oscillator 181, and 430 kHz signal E182 is obtained from a X'tal oscillator 182. Oscillator 181 is formed of an inverter 18E whose input is coupled to its output via a 480 kHz crystal vibrator element 18F. A resistor R181 is connected in parallel to element 18F. The output of inverter 18E is circuit-grounded via a capacitor C181, and the input thereof is circuit-grounded via a capacitor C182. Oscillator 182 is formed of an inverter 18G whose input is coupled to its output via a 430 kHz crystal vibrator element 18H. A resistor R182 is connected in parallel to element 18H. The output of inverter 18G is circuit-grounded via a capacitor C183, and the input thereof is circuit-grounded via a capacitor C184.

The input of inverter 18E is coupled via a diode 22A to the Q output of flip-flop 16C (FIG. 2B), and the input of inverter 18G is coupled via a diode 22B to the Q output of flip-flop 16C. When the logic level of control output X15 from the Q output of flip-flop 16C is "0" (reception mode), each input of inverters 18E and 18G is circuit-grounded via the anode-cathode path of each of diodes 22A and 22B, so that no oscillation occurs. When the logic level of control output X15 is "1" (transmission or delivery mode), each of diodes 22A and 22B is reversely biased so that these diodes are cut-off. Then, each input of inverters 18E and 18G is free from the circuit ground, and oscillators 181 and 182 are effected so that inverter 18E provides the 480 kHz signal and inverter 18G provides the 430 kHz signal.

Signal E18 from AND gate 18D is supplied via a capacitor C191 to the base of an NPN transistor 19A. The base of transistor 19A is circuit-grounded via a resistor R191, and the emitter thereof is circuit-grounded via a resistor R192. The collector of transistor 19A receives via a resistor R193 the electric power P21 (+Vcc) from battery 21 (FIG. 1). The collector of transistor 19A is connected to the base of a PNP transistor 19B. The collector of transistor 19B is circuit-grounded via a capacitor C192, and the emitter thereof receives power P21 via a resistor R194. The junction between resistors R193 and R194 is bypassed through a capacitor C193 to the circuit ground. The collector of transistor 19B is coupled via the anode-cathode path of a diode 19C to the emitter thereof. Elements 19A–19C, C191–C193, and R191–R194 constitute the transmitter 19. RF signal E19, whose wave form is the same as that of signal E18 (FIG. 4B), is obtained from the collector of transistor 19B.

Now description will be given to the circuit operation of the embodiment of FIGS. 2A to 2C with reference to the timing charts of FIGS. 3A to 3G, 4A and 4B.

Binary information of reception signal E12 or that of amplified received signal E13 is formed of a series of 0/1 signals. A part of these 0/1 signal series is shown in FIG. 3A. The binary "1" of signal E13 is represented by a 75% duty (=3T/4T) burst signal of 410 kHz, and the binary "0" of signal E13 is represented by a 25% duty (=T/4T) burst signal of 410 kHz (FIGS. 3A and 3B). The assigned transmission rate for period T is 9600 bps. Accordingly, the transmission rate for one bit (4T) is 2400 bps.

410 kHz burst signal E13 is demodulated (amplitude detected) in demodulator 14, and the envelope of signal E13 is obtained as binary information E14 (FIG. 3C) from demodulator 14. Elements 15A to 15C in FIG. 2A is responsive to the rising or leading edge of signal E15A which corresponds to information E14 (t10, t14, t18 and t22 in FIGS. 3C and 3D). After 2T from the leading edge of E15A, clock pulse E15F having very narrow pulse width is generated (t12, t16, t20 and t24 in FIGS. 3D and 3E). The period 2T is determined by the time constant of C153 and R153. The pulse width of E15F is determined by the time constant of C154 and R154.

When D flip-flop 15G in FIG. 2A is clocked by E15F under E15A="1", signal DATA from Q output of flip-flop 15G becomes logic "1" (t12 in FIGS. 3C, 3E and 3F). When D flip-flop 15G is clocked by E15F under E15A="0", signal DATA becomes logic "0" (t16 in FIGS. 3C, 3E and 3F).

16 series bits of signal DATA are temporarily stored in 8-bit shift registers 15H and 15I (FIG. 2A). Shift register 15I stores the former 8 bits and shift register 15H stores the latter 8 bits. The 8 bits data "11111111" of the former bits are detected by AND gates 15P and 15N. The 8 bits data "01111111" of the latter bits are detected by AND gates 15M and 15L. The 8 bits data "00000000" of the latter bits are detected by AND gates 15K and 15J. The aforementioned 16 bits write command "1111111101111111" is detected from the logical AND of outputs from gates 15P, 15N, 15M and 15L. When the write command is detected, write pulse WR becomes logic "0", while the logic level of read pulse RD is "1". The aforementioned 16 bits read command "1111111100000000" is detected from the logical AND of outputs from gates 15P, 15N, 15K and 15J. When the read command is detected, read pulse RD becomes logic "0", while the logic level of write pulse WR is "1".

When write pulse WR becomes "0", flip-flop 16B in FIG. 2B is preset so that the Q output signal from flip-flop 16B becomes "1" and inverted $\overline{Q}$ output signal therefrom becomes "0". Then, NAND gate 16E is opened so that the inverted level of signal E15C is applied to the read/write designation input R/W of RAM 170, and chip enable signal E16G becomes "0" so that RAM 170 is enabled. When each logic level of Q output signal from flip-flop 16B and signal E15C is "1", read/write signal E16E becomes logic "0" so that inverting bus buffer 16A supplies signal DATA to data port D$\phi$ of RAM 170 and the logic level "0" at R/W input renders the RAM to the "write" mode. Then, 512 bits data following to the detected write command is written in RAM 170. When the storing for 512 bits data is completed, an inverted $\overline{Q}$ output signal E16M from flip-flop 16M clears flip-flops 16B and 16C.

When read pulse RD becomes "0", flip-flop 16C in FIG. 2B is preset so that the Q output (=control output X15) from flip-flop 16C becomes "1" and inverted $\overline{Q}$ output (=inhibition signal E16C) therefrom becomes "0". In this case, flip-flop 16B is not preset and NAND gate 16E is closed. Then, the logic level of signal E16E at the read/write designation input R/W of RAM 170 becomes logic "1" so that bus buffer 16A is open-circuited while the RAM is in the "read" mode, and chip enable signal E16G becomes "0" so that RAM 170 is enabled for data reading out. The read data in the read mode is obtained from data port D$\phi$ of RAM 170.

Incidentally, logic "0" of signal E16C serves to close the gate 15A in FIG. 2A, so that the data supply to decoder 15 is inhibited.

In the write mode, since flip-flop 16C is not preset, control output X15 is logic "0". Then, both inputs of inverters 18E and 18G in FIG. 2C are circuit-grounded via diodes 22A and 22B, so that no oscillation occurs. In this case, since transistors 19A and 19B are both cut off, no power is consumed in transmitter 19, thereby saving the power P21 from battery 21. When other circuit elements in medium 11 is formed of CMOS devices, the total power consumption can be made very small. Further, in the write mode, a fast circuit operation for data renewal is not required. From this, the clocking rate for the address counter, which is formed of elements 16I to 16K, is reduced to the rate of signal E15C. The low operation speed for CMOS devices serves to further reduce the total power consumption.

In the read mode, since flip-flop 16C (FIG. 2B) is preset, control output X15 is logic "1". Then, both inputs of inverters 18E and 18G in FIG. 2C are free from the circuit ground, and each of oscillators 181 and 182 starts to oscillate the 480 kHz and 430 kHz signals E181 and E182. In this case, 480 kHz signal E181 is frequency-divided by divider 16D (FIG. 2B) to 9.6 kHz signal E16D, and this signal E16D is used for clocking the address counter of RAM 170. Information E16 is read out from RAM 170 with the rate of 9.6 kHz. This read out information E16 is modulated alternatively by 480 kHz signal E181 or 430 kHz signal E182 (two-frequency FSK). When E16=1, E16 is modulated by 430 kHz, and when E16=0, E16 is modulated by 480 kHz. The alternatively modulated signal E18 drives the transmitter 19. The transmission or delivery of read out information E16 is carried out until the read out of 512 bits data is completed. When the transmission of 512 bits data is completed, signal E16M from flip-flop 16M (FIG. 2B) clears flip-flops 16B and 16C so that the oscillation of each of oscillators 181 and 182 is stopped. When the oscillation is stopped, transistors 19A and 19B in transmitter 19 is cut off.

In the embodiment of FIG. 2C, although the power supply line of transmitter 19 and other circuit elements (CMOS) being operated by 480 kHz and 430 kHz signals are not directly switched by electronic switch 22, diodes 22A and 22B equivalently serve as electronic switch 22 for on/off controlling the power supply of transmitter 19 and said other circuit elements. This is because, when transmitter 19 and said other circuit elements are not driven by the 480 kHz and 430 kHz signals, all of transmitter and these circuit elements are cut off in DC sense.

Figure 6:
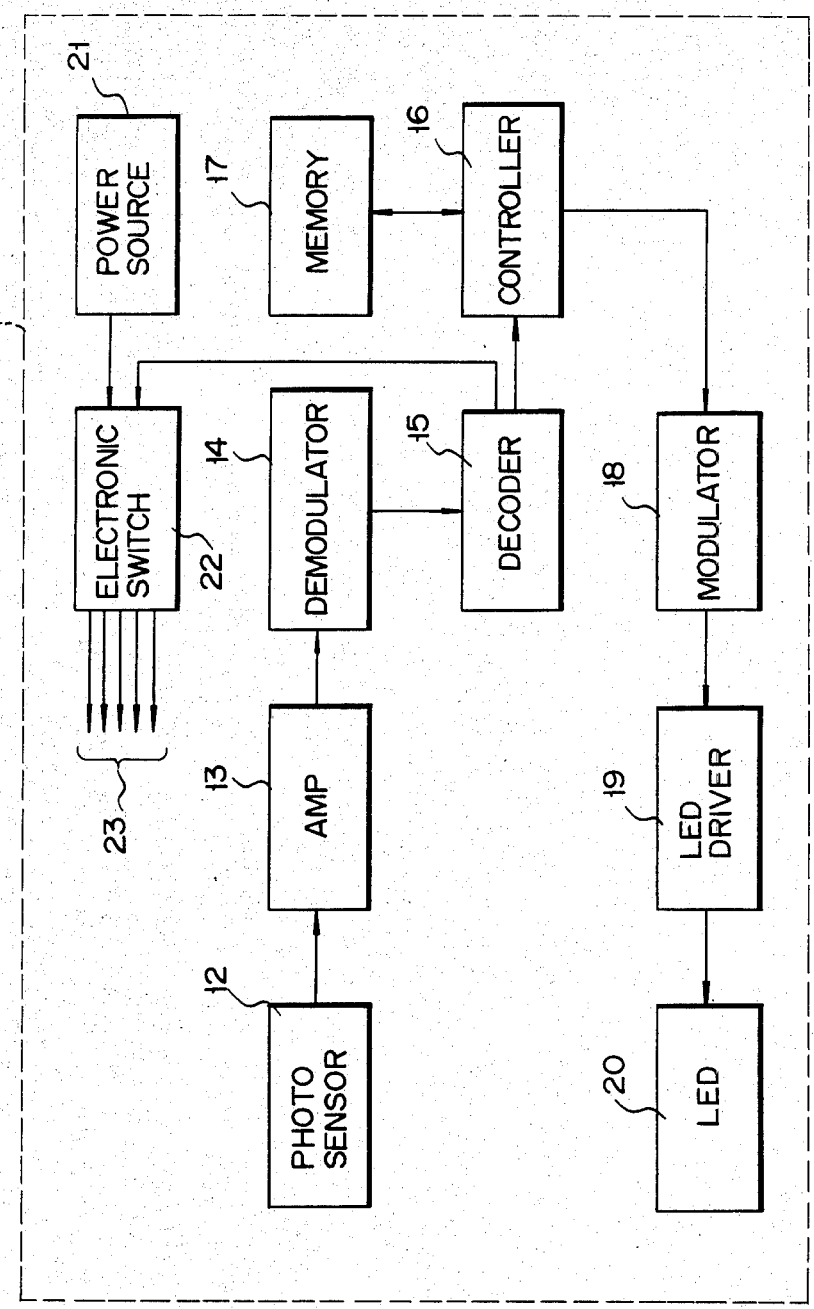
FIG. 6 shows a block configuration of an information medium according to still another embodiment of the present invention, wherein light is utilized for the signal reception/delivery.

FIG. 5 shows a block configuration of an information medium according to another embodiment of the present invention, wherein a sonic wave is utilized for the signal reception/delivery. FIG. 6 shows a block configuration of an information medium according to still another embodiment of the present invention, wherein light obtained from an LED or the like is utilized for the signal reception/delivery. The configuration of FIGS.

2A to 2C may be applied to the corresponding circuit elements in FIGS. 5 and 6.

According to the embodiment of the invention, information medium 11 is provided with battery 21, and the reception/delivery of information is carried out by means of a modulated radio wave, modulated sonic wave or modulated light. From this, the medium of the invention requires no external electrical contact, thereby avoiding an accident due to contact failure and obtaining a long life span of the medium. Further, the information medium has a function to change the stored contents of the memory device, so that various possible uses are expected. Still further, the information medium contains a battery and a switch which serves to energize only the necessary part of circuit elements in the medium, so that the power consumption for the battery is saved. To be concrete, transmitter 19 which consumes much power is energized only in a transmission or delivery mode.

What is claimed is:

1. An information medium used for receiving/delivering information from/to an exterior device, comprising:
   receiver means for receiving a modulated input signal from the exterior device;
   demodulator means coupled to said receiver means for demodulating said modulated input signal to provide specific information which is formed of a binary signal having a given bit pattern;
   decoder means coupled to said demodulator means for decoding said specific information to provide a decoded instruction corresponding to whatever binary signal is provided by said demodulator;
   memory means for storing given data;
   control means coupled to said decoder means and memory means, for controlling a write or read operation of said memory means in accordance with the contents of said decoded instruction;
   battery means for generating electric power; and
   switch means coupled to said decoder means and battery means, for selectively activating any of said receiver means, demodulator means, memory means and control means by said electric power; the selection of said switch means for the power supply depending on the contents of said specific information.

2. An information medium according to claim 1, further comprising:
   modulator means coupled to said control means for generating a modulated signal which corresponds to data read-out from said memory means; and
   transmitter means coupled to said modulator means for delivering to the exterior device a transmission signal which corresponds to said modulated signal;
   and wherein said switch means has a function for selectively supplying said electric power to any of said receiver means, demodulator means, modulator means and transmitter means; the selection of said switch means for the power supply depending on the contents of said specific information.

3. An information medium according to claim 1, wherein said memory means includes a RAM.

4. An information medium according to claim 1, wherein said memory means includes an EPROM.

5. An information medium according to claim 1, wherein said modulated input signal is a radio wave.

6. An information medium according to claim 1, wherein said modulated input signal is a sonic wave.

7. An information medium according to claim 1, wherein said modulated input signal is light.

8. An information medium according to claim 2, wherein said transmission signal is a radio wave.

9. An information medium according to claim 2, wherein said transmission signal is a sonic wave.

10. An information medium according to claim 2, wherein said transmission signal is light.

11. An information medium according to claim 2, wherein each of said modulated input signal and transmission signal is a radio wave, and said receiver means and transmitter means commonly include an antenna for receiving and delivering the radio wave.

12. An information medium according to claim 2, wherein each of said modulated input signal and transmission signal is a sonic wave, and said receiver means and transmitter means commonly include an electric/sonic converter for receiving and delivering the sonic wave.

13. An information medium according to claim 2, wherein each of said modulated input signal and transmission signal is light,
    and wherein said receiver means includes a light-to-electric converter for receiving the modulated input signal light, and said transmitter means includes an electric-to-light converter for delivering or emitting the transmission signal light.

* * * * *